Dec. 11, 1934.  W. B. BARNES  1,983,834
PLANETARY TRANSMISSION AND SYNCHRONIZER
Filed Aug. 9, 1933
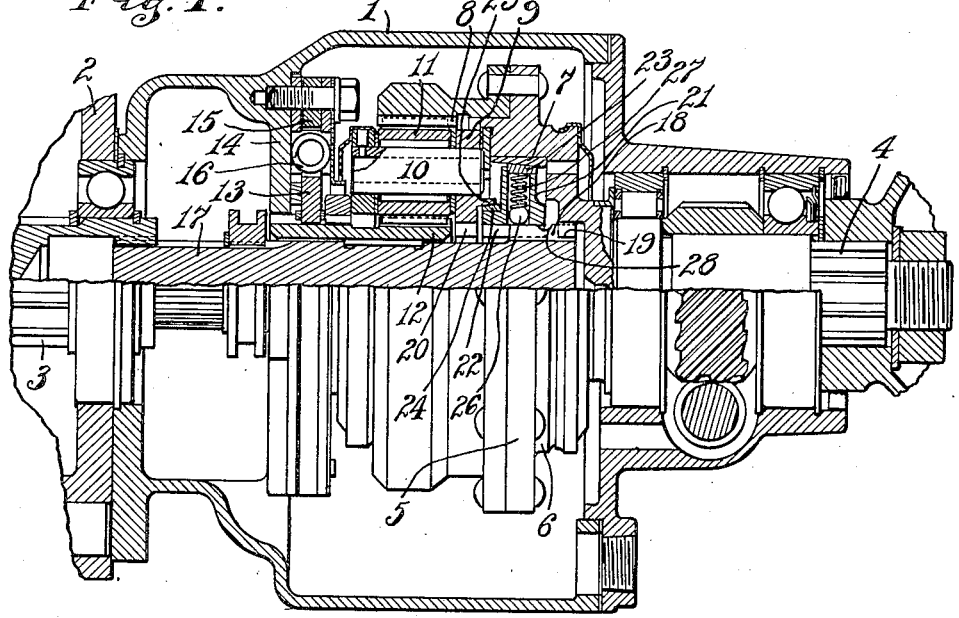
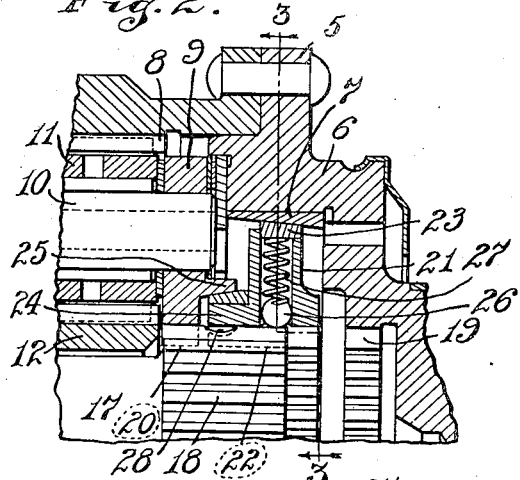
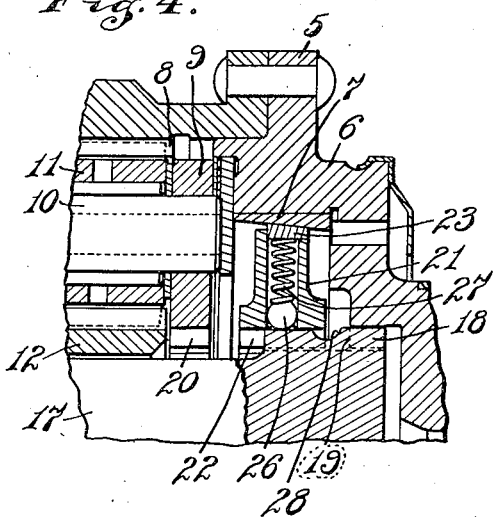
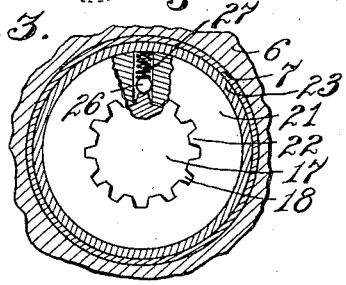
INVENTOR.
William B. Barnes,
BY Hood & Hahn
ATTORNEYS Patented Dec. 11, 1934

1,983,834

UNITED STATES PATENT OFFICE 1,983,834

PLANETARY TRANSMISSION AND SYNCHRONIZER

William B. Barnes, Indianapolis, Ind.

Application August 9, 1933, Serial No. 684,389

4 Claims. (Cl. 74—290)

My invention relates to improvements in transmissions and particularly to a transmission for automobile vehicles adapted for cooperation with the main transmission of the vehicle whereby a supplemental speed change may be obtained.

My invention relates particularly to a type of planetary gear overdrive transmission primarily adapted for association with the main transmission of the vehicle and more specifically, my invention relates to means for controlling the operation of this overdrive transmission.

For the purpose of disclosing my invention I have illustrated one embodiment thereof in the accompanying drawing in which Fig. 1 is a longitudinal sectional view of a transmission embodying my invention;

Fig. 2 is a detail view of the synchronizing clutch used in connection with my transmission;

Fig. 3 is a sectional view taken on the line 3—3 of Fig. 2 and

Fig. 4 is a detail sectional view showing a modification.

In the embodiment of the invention illustrated I provide a supplemental transmission casing 1 adapted for attachment to the primary or main transmission casing 2. A driving shaft 3, which is driven through the instrumentality of the main transmission extends into the casing 1 and the vehicle propeller shaft 4 extends into the casing 1 from the opposite end. This vehicle propeller shaft is provided with an annular head 5 having an overhanging portion 6 preferably lined with friction material 7 and forming one member of a friction clutch. This annular head 5 constitutes a driving member for the shaft 4 and may be formed integrally therewith or may be formed separately and secured to the shaft. Connected to this head 5 is a ring gear 8 of a planetary transmission gearing. This gearing includes a pinion carrier 9 provided with suitable spindles 10 on which the pinions 11 of the planetary gear are mounted. These pinions not only mesh with the ring gear 8 but also are adapted to mesh with a sun gear 12 which is formed on a hollow sleeve. The sleeve has splined thereon a disk 13 provided with radial teeth and secured to a wall 14 of the casing 1 is a second disk 15 having radial fingers interdigitated with the fingers of the disk 13, coil springs 16 being interposed between the two sets of interdigitated fingers whereby the disk 13 is held against rotation, in turn holding the sleeve of the sun gear 12 against rotation and at the same time the vibrations set up in the planetary transmission are absorbed by the springs 16 to prevent undue vibration noises being set up in the casing.

For controlling the operation of the planetary gear mechanism I provide an axially shiftable member 17 preferably in the form of a supplemental shaft splinedly connected at one end with the shaft 3. The opposite end of this axially shiftable member is provided with teeth 18 adapted to mesh selectively with teeth 19 on the head 5 or with teeth 20 on the pinion carrier 9.

Rotatably connected with the axially-shiftable member 17 is a friction clutch member 21 provided with internal teeth 22 meshing with the teeth 18 of the axially-shiftable member and this friction clutch member 21 is provided with a cone friction surface 23 adapted to cooperate with the friction surface 7 on the head 5. The friction clutch member 21 is also provided with a cone friction surface 24 adapted to cooperate with an annular cone flange 25 on the pinion carrier 9. Ball poppets 26 are arranged within the friction clutch member 21 and are biased inwardly by suitable coiled springs 27. The teeth 18 on the axially-shiftable member 17 are provided with cammed recesses 28 adapted, when the parts are in neutral position, to receive the poppets 25. When the axially-shiftable member 17 is moved to the right, looking at Fig. 1, the friction clutch member 21 will be resiliently locked to the axially-shiftable member 17 by the ball poppets and the friction clutch surface 23 will be moved into engagement with the friction clutch surface 7, thus frictionally connecting the shafts 3 and 4 through the instrumentality of the intermediate axially shiftable member 17 and the friction clutch. A continued movement of the axially-movable member 17 to the right engages the teeth 18 with the teeth 19 on the driven shaft 4, thus positively connecting the shafts 3 and 4.

When the axially shiftable member 17 is moved to the left, from neutral position, the friction clutch member 21 will be moved to the left therewith, engaging the friction clutch surfaces 24 and 25. Due to the resilient connection between the friction member 21 and the axially shiftable member 17, the member 17 may continue in its movement to the left, engaging the teeth 18 with the teeth 20 on the pinion carrier, and when this engagement is made the shaft 4 will be driven by the shaft 3 through the overspeed planetary transmission.

In the structure illustrated in Fig. 4 I have shown the friction clutch member 21 as cooperating only with the friction clutch member 6, the members 24 and 25 being left off, so that, the synchronizing effect of the friction clutch member 21 and its associated parts will be operative only when shifting for a direct drive.

I claim as my invention:

1. In a transmission, the combination with a driven shaft, of a driving member therefor having formed thereon, positive clutch teeth, a ring gear and one member of a friction clutch, a driving shaft, an intermediate shaft axially shiftable relatively to said driving and driven shafts and drivingly connected to the driving shaft, clutch teeth on said intermediate shaft for engagement with the clutch teeth of said driving member, a stationarily mounted sun gear, a plurality of pinions interposed between said sun and ring gears, a mounting for said pinions, means for drivingly connecting said mounting with said intermediate shaft, a second member of a friction clutch resiliently connected to said intermediate shaft and movable by said intermediate shaft into engagement with its cooperating member prior to the engagement of the positive clutch teeth.

2. In a transmission, the combination with a driven shaft, of a driving member therefor having formed thereon clutch teeth, and a ring gear, a sun gear stationarily connected to the casing and pinion gears interposed between said sun gear and said ring gear, a driving shaft, an axially-shiftable friction clutch member for cooperation with the friction clutch of said driving member and axially shiftable means having clutch teeth for drivingly connecting said driven shaft with the driving shaft through said ring and its associated gears, or directly by engagement with the positive clutch teeth on the driving member and means operated by said axially shiftable member for engaging said friction clutch members prior to the engagement of the clutch teeth on the driving member.

3. In a transmission, the combination with a driven shaft, of a driving member therefor having formed thereon positive clutch teeth, and one gear of a planetary transmission, a driving shaft, an intermediate axially shiftable member having clutch teeth thereon for cooperation with the clutch teeth of the driving member, a friction clutch member mounted on said axially shiftable member, means on said axially shiftable member for connecting the driving shaft with the drive shaft through said planetary gear transmission, and means for axially shifting said friction clutch member into engagement prior to the engagement of the positive clutch teeth of the driving member and the axially-shiftable member.

4. In a transmission, the combination with a driven shaft, of a driving member therefor having formed thereon clutch teeth, one member of a friction clutch, and one gear of a planetary transmission, planetary gear pinions for cooperation with said gear, a pinion carrier, one member of a friction clutch carried by said pinion carrier, positive clutch teeth on said pinion carrier, an axially shiftable member having clutch teeth for engagement with the clutch teeth of said pinion carrier or with the clutch teeth of said driving member, a friction clutch member having clutch faces for cooperation with either of said friction clutch members, and means operated by said axially shiftable member for initially engaging said friction clutch members with their respective parts prior to the engagement of the positive clutch teeth of said axially-shiftable member.

WILLIAM B. BARNES.